(12) United States Patent
Tanaka et al.

(10) Patent No.: US 8,064,331 B2
(45) Date of Patent: Nov. 22, 2011

(54) TRANSMITTING APPARATUS AND METHOD FOR MAINTAINING LEARNED INFORMATION

(75) Inventors: Masayuki Tanaka, Kawasaki (JP); Satoshi Tanaka, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1101 days.

(21) Appl. No.: 11/442,221

(22) Filed: May 30, 2006

(65) Prior Publication Data

US 2007/0190998 A1    Aug. 16, 2007

(30) Foreign Application Priority Data

Feb. 14, 2006   (JP) ................................ 2006-037221

(51) Int. Cl.
 *G01R 31/08*  (2006.01)
 *H04L 12/28*  (2006.01)
(52) U.S. Cl. .................... 370/216; 370/254; 370/401
(58) Field of Classification Search .................. None
 See application file for complete search history.

(56) References Cited

U.S. PATENT DOCUMENTS

| | | | | |
|---|---|---|---|---|
| 5,339,317 A * | 8/1994 | Tanaka et al. | ................. | 370/460 |
| 5,757,768 A * | 5/1998 | Goto et al. | .................... | 370/222 |
| 6,032,194 A * | 2/2000 | Gai et al. | ....................... | 370/216 |
| 6,331,983 B1 * | 12/2001 | Haggerty et al. | ............. | 370/400 |
| 7,009,934 B1 * | 3/2006 | Perkins et al. | ................. | 370/228 |
| 7,412,538 B1 * | 8/2008 | Eytchison et al. | ............ | 370/352 |
| 2002/0085567 A1 * | 7/2002 | Ku et al. | ........................ | 370/396 |
| 2002/0181485 A1 * | 12/2002 | Cao et al. | ....................... | 370/419 |
| 2003/0112760 A1 * | 6/2003 | Puppa et al. | ............... | 370/241.1 |
| 2004/0034722 A1 * | 2/2004 | Saito | ................................... | 710/5 |
| 2004/0071090 A1 * | 4/2004 | Corson et al. | ................ | 370/244 |
| 2004/0081084 A1 * | 4/2004 | Goode et al. | .................. | 370/224 |
| 2004/0131064 A1 * | 7/2004 | Burwell et al. | ............... | 370/397 |
| 2004/0223461 A1 * | 11/2004 | Scrandis et al. | ............... | 370/242 |
| 2005/0135346 A1 * | 6/2005 | Oyamada et al. | ............. | 370/352 |
| 2006/0029076 A1 * | 2/2006 | Namihira et al. | ............ | 370/392 |
| 2007/0019540 A1 * | 1/2007 | Biswas et al. | ................. | 370/217 |
| 2008/0212475 A1 * | 9/2008 | Oueslati et al. | ............... | 370/235 |

FOREIGN PATENT DOCUMENTS

| | | |
|---|---|---|
| JP | 2-140034 | 5/1990 |
| JP | 2000-261484 | 9/2000 |
| JP | 2004-357115 | 12/2004 |
| JP | 2005-244470 | 9/2005 |
| JP | 2007-89079 | 4/2007 |

OTHER PUBLICATIONS

Japanese Office Action mailed Sep. 28, 2010 in corresponding Japanese Patent Application 2006-037221.

\* cited by examiner

*Primary Examiner* — Chirag G Shah
*Assistant Examiner* — Joshua Smith
(74) *Attorney, Agent, or Firm* — Staas & Halsey LLP

(57) ABSTRACT

A protocol converting unit stores identification information for identifying a transfer path for data in a second network and a transmission source address specified in a packet in a corresponding manner. A failure detecting unit detects a transfer path in which a failure has occurred in the second network. A dummy-packet transmitting unit obtains a transmission source address corresponding to identification information of the transfer path in which the failure is detected, and transmits a dummy packet in which the obtained transmission source address is specified as the transmission source address to a first network.

11 Claims, 12 Drawing Sheets

TRANSMITTING APPARATUS AND METHOD FOR MAINTAINING LEARNED INFORMATION

BACKGROUND OF THE PRESENT INVENTION

1. Field of the Present Invention

The present invention relates to a transmitting apparatus that connects between networks and a method for maintaining learned information in the transmitting apparatus, and more particularly, to a transmitting apparatus and a method for maintaining learned information capable of preventing an improper deletion of the learned information due to a path failure.

2. Description of the Related Art

Conventionally, a large-scale network often has an arrangement in which each of distal networks that are directly used by end users is structured using an Ethernet™, which is easy to manage, and these networks are connected to one another using one of the asynchronous transfer mode (ATM) or the synchronous optical network/synchronous digital hierarchy (SONET/SDH), each of which assures a high speed and high reliability.

The ATM and the like has a function of autonomously detecting a failure that has occurred in a path or in a node in a network and switching the communication path to a backup path that is prepared in advance so that the point of failure can be bypassed. To utilize this function effectively and to improve the reliability of the entire network, a technique is publicly known to make it possible to detect a failure that has occurred in an Ethernet™ network using an ATM switch connected to the Ethernet™ network (see, for example, Japanese Patent Application Laid-Open No. 2004-357115).

However, even if this technique is used, when another failure has also occurred in the backup path, the communication between Ethernet™ networks is interrupted. When the communication between the Ethernet™ networks is interrupted, not only is the communication disabled during the failure period, but also some problems may occur even after the situation with the interruption has been resolved.

In an Ethernet™ network, to reduce occurrence of unnecessary traffic, a switch used for relaying packets (frames) stores therein learned information in which the receiving port of the relayed packet is shown in correspondence with the transmission source address and uses the learned information to judge the forward destinations when relaying packets. To utilize the storage area effectively, a function called aging deletes some part of the learned information that have not been used for a period of a certain length of time.

For this reason, when the interruption of the communication between Ethernet™ networks lasts longer than a certain period of time, some part of the learned information stored in the switch or the like that are related to the Ethernet™ networks experiencing the interruption will be all deleted due to the aging function. When a large amount of learned information is deleted this way, the traffic in the entire network increases by a large amount after the situation with the interruption has been resolved. In some cases, there is a possibility that a new failure occurs because of the increase in the traffic.

SUMMARY OF THE PRESENT INVENTION

It is an object of the present invention to at least partially solve the problems in the conventional technology.

A transmitting apparatus according to one aspect of the present invention connects a first network to a second network. The first network has a function of storing information including a transmission source address specified in a packet as learned information and using the learned information for controlling a path and a function of deleting information not used for a predetermined time from the learned information. The transmitting apparatus includes a protocol converting unit that stores, when converting data transmitted from the second network to the first network into a packet in a format that is transferable in the first network, identification information for identifying a transfer path for the data in the second network and a transmission source address specified in the packet after the conversion in a corresponding manner in a storage unit; a failure detecting unit that detects a transfer path in which a failure has occurred in the second network; and a dummy-packet transmitting unit that obtains a transmission source address corresponding to identification information of the transfer path in which the failure is detected by the failure detecting unit from the information stored in the storage unit, and transmits a dummy packet in which the obtained transmission source address is specified as the transmission source address to the first network.

A transmitting apparatus according to another aspect of the present invention connects a first network to, a second network. The first network has a function of storing information including a transmission source address specified in a packet as learned information and using the learned information for controlling a path and a function of deleting information not used for a predetermined time from the learned information. The transmitting apparatus includes a first communication control unit that controls a communication with the first network; a second communication control unit that controls a communication with the second network; and a protocol converting unit that intermediates between the first communication control unit and the second communication control unit, and performs a protocol conversion to enable a communication between the first network and the second network. The second communication control unit detects a transfer path in which a failure has occurred in the second network, and notifies the protocol converting unit of identification information of the transfer path. When converting data transmitted from the second network to the first network into a packet in a format that is transferable in the first network, the protocol converting unit stores identification information for identifying a transfer path for the data in the second network and a transmission source address specified in the packet after the conversion in a corresponding manner in a storage unit. Upon being notified by the second communication control unit of the identification information of the transfer path in which the failure has occurred, the protocol converting unit obtains a transmission source address corresponding to the notified identification information from the information stored in the storage unit, and transmits a dummy packet in which the obtained transmission source address is specified as the transmission source address to the first network.

A transmitting apparatus according to still another aspect of the present invention connects a first network to a second network. The first network has a function of storing information including a transmission source address specified in a packet as learned information and using the learned information for controlling a path and a function of deleting information not used for a predetermined time from the learned information. The transmitting apparatus includes a first communication control unit that controls a communication with the first network; a second communication control unit that controls a communication with the second network; and a protocol converting unit that intermediates between the first communication control unit and the second communication control unit, and performs a protocol conversion to enable a communication between the first network and the second network. When converting data transmitted from the second network to the first network into a packet in a format that is transferable in the first network, the protocol converting unit notifies identification information for identifying a transfer path for the data in the second network and a transmission source address specified in the packet after the conversion. The second communication control unit detects a transfer path in which a failure has occurred in the second network, and notifies the first communication control unit of identification information of the transfer path. The first communication control unit stores the identification information of the transfer path and the transmission source address notified by the converting unit in a corresponding manner in a storing unit, obtains a transmission source address corresponding to the identification information of the transfer path notified by the second communication control unit from the information stored in the storing unit, and transmits a dummy packet in which the obtained transmission source address is specified as the transmission source address to the first network.

A method according to still another aspect of the present invention is for preventing a loss of learned information due to a failure in a second network in a network configured by connecting a first network to the second network. The first network has a function of storing information including a transmission source address specified in a packet as the learned information and using the learned information for controlling a path and a function of deleting information not used for a predetermined time from the learned information. The method includes storing, when converting data transmitted from the second network to the first network into a packet in a format that is transferable in the first network, identification information for identifying a transfer path for the data in the second network and a transmission source address specified in the packet after the conversion in a corresponding manner in a storage unit; detecting a transfer path in which a failure has occurred in the second network; obtaining a transmission source address corresponding to identification information of the transfer path in which the failure is detected by the failure detecting unit from the information stored in the storage unit; and transmitting a dummy packet in which the obtained transmission source address is specified as the transmission source address to the first network.

The above and other objects, features, advantages and technical and industrial significance of this invention will be better understood by reading the following detailed description of presently preferred embodiments of the present invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
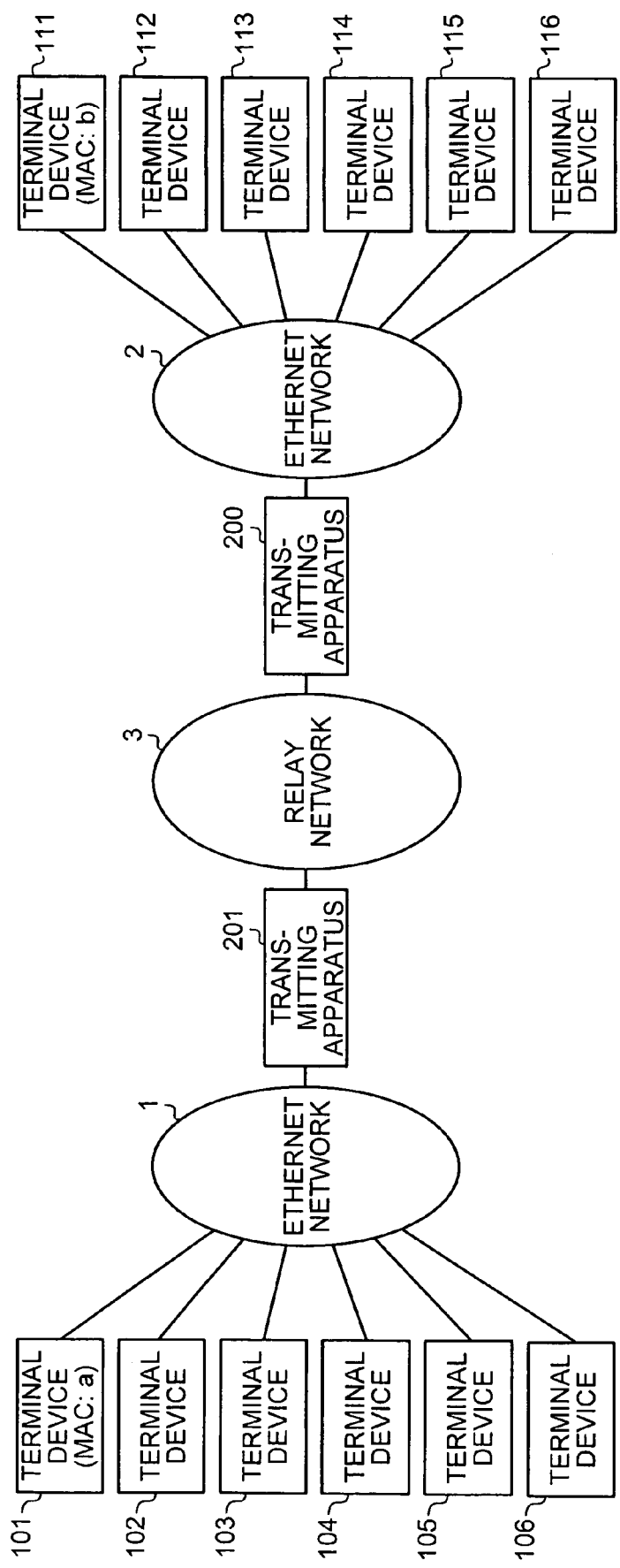
FIG. 1 is a sample diagram of a configuration of a network used for explaining a method for maintaining learned information according to a first embodiment of the present invention.

FIG. 1 is a sample diagram of a configuration of a network used for explaining the method for maintaining learned information according to a first embodiment of the present invention.

The network includes an Ethernet™ network 1 and an Ethernet™ network 2 that are connected to each other with a relay network 3 that uses the ATM or the like. Terminal devices 101 to 106 like personal computers (PCs) are connected to the Ethernet™ network 1. Terminal devices 111 to 116 are connected to the Ethernet™ network 2. Also, the Ethernet™ network 1 and the relay network 3 are connected to each other via a transmitting apparatus 201. The Ethernet™ network 2 and the relay network 3 are connected to each other via a transmitting apparatus 200.

A path learning process performed in the Ethernet™ network 2 will be explained using an example in which the terminal device 101 of which the media-access-control (MAC) address is "a" transmits a packet toward the terminal device 111 of which the MAC address is "b". It is assumed that the Ethernet™ network 2 has not performed any path learning process so far.

Figure 2:
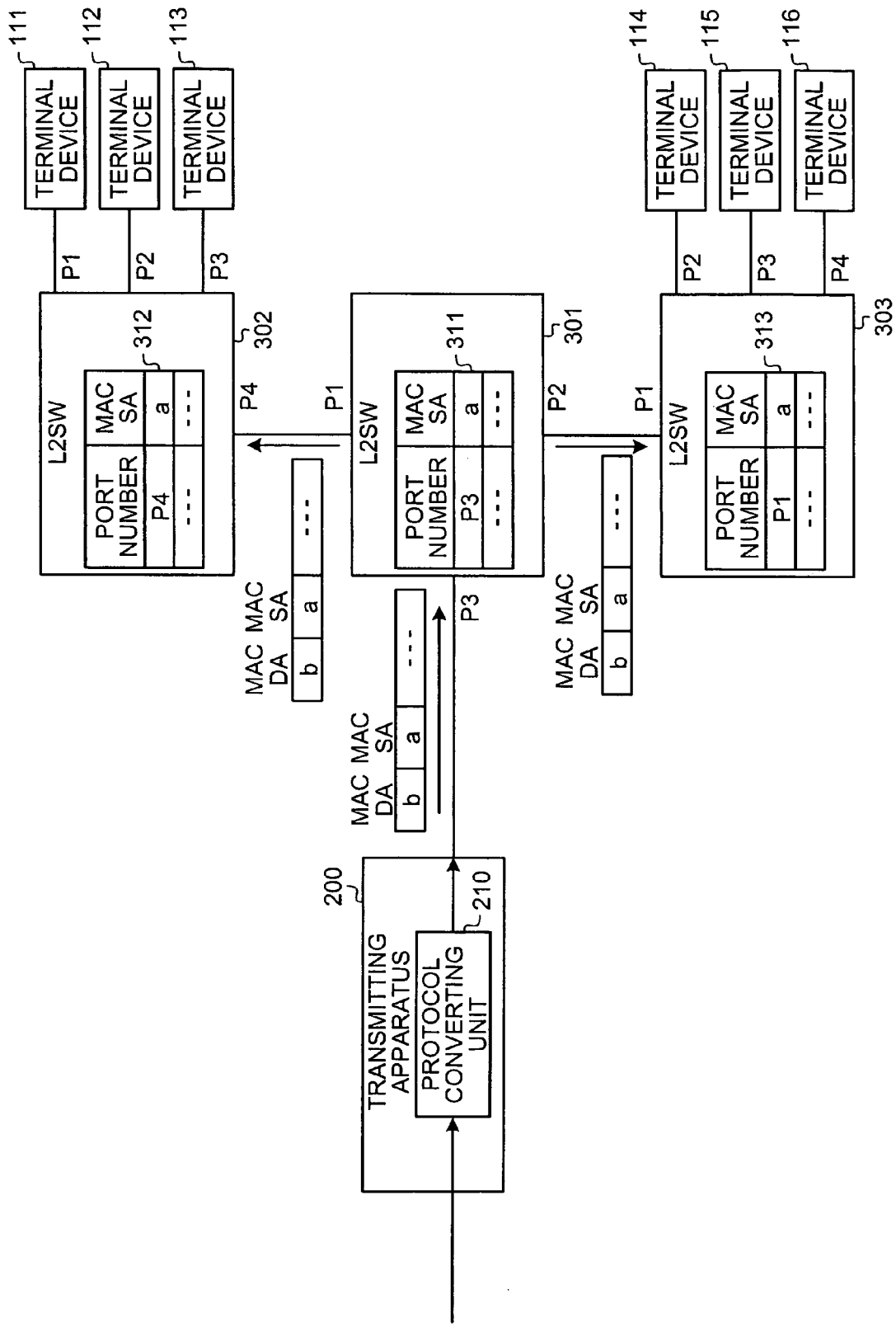
FIG. 2 is a diagram for explaining a path learning process performed by an Ethernet™ network.

FIG. 2 is a diagram for explaining the path learning process performed in the Ethernet™ network 2. The transmitting apparatus 200 includes a protocol converting unit 210 that converts protocols between the protocol used in the relay network 3 and the Ethernet™ protocol. The protocol converting unit 210 reconstructs a packet transmitted by the terminal device 101 with the information that has passed through the relay network 3 and transmits the packet into the Ethernet™ network 2.

The Ethernet™ network 2 includes layer 2 switches (L2SWs) 301 to 303 that are connected to one another. The layer 2 switch 301 is connected to the layer 2 switch 302 via a port 1 (P1), is connected to the layer 2 switch 303 via a port 2, and is connected to the transmitting apparatus 200 via a port 3.

The layer 2 switch '302 is connected to the terminal devices 111 to 113 via ports 1, 2, and 3, respectively, and is connected to the layer 2 switch 301 via a port 4. The layer 2 switch 303 is connected to the layer 2 switch 301 via a port 1, and is connected to the terminal devices 114 to 116 via ports 2 to 4, respectively.

When no path learning process has been performed yet, each of the layer 2 switches 301 to 303 forwards a received packet to all the ports except the port through which the packet has been received. This operation is called "flooding".

In the example shown in FIG. 2, the layer 2 switch 301 forwards the packet that has been transmitted from the transmitting apparatus 200 and has been received through the port 3, to the layer 2 switch 302 through the port 1, and also forwards the packet to the layer 2 switch 303 through the port 2. The layer 2 switch 302 forwards the packet that has been received through the port 4 to the terminal devices 111 to 113 via the ports 1 to 3, respectively. The layer 2 switch 303 forwards the packet that has been received through the port 1 to the terminal devices 114 to 116 through the ports 2 to 4, respectively.

Through this flooding operation, the packet reaches the terminal device 111, which is the intended destination; however, the packet is also forwarded to the terminal devices 112 to 116 that are irrelevant. In other words, because of the flooding operation, the packet is transmitted to all the terminal devices including the intended destination terminal device, but the load on the network is increased.

To reduce the increase in the load on the network caused by the flooding operation, each of the layer 2 switches 301 to 303 performs a path learning process by storing therein, as learned information, corresponding relationship between the transmission source MAC address (hereinafter, a "MAC SA (source address)") of the packet that the layer 2 switch has forwarded and the number assigned to the port through which the packet has been received.

In the example shown in FIG. 2, when forwarding the packet that has been transmitted from the transmitting apparatus 200, the layer 2 switch 301 stores therein a set made up of the MAC address "a" and the port number "P3" as learned information 311. Likewise, the layer 2 switch 302 stores therein a set made up of the MAC address "a" and the port number "P4" as learned information 312. The layer 2 switch 303 stores therein a set made up of the MAC address "a" and the port number "P1" as learned information 313.

The pieces of learned information 311 to 313 are used by the layer 2 switches 301 to 303 when traffic in the opposite direction occurs.

For example, when the terminal device 114 transmits a packet to the terminal device 101, the layer 2 switch 303 detects that the transmission destination MAC address (hereinafter a "MAC DA (destination address)"), namely "a", of the packet transmitted from the terminal device 114 is registered in correspondence with the port number "P1" in the learned information 313 and forwards the packet only to the port 1, without performing the flooding operation.

Likewise, the layer 2 switch 301 detects that the MAC DA, namely "a", of the packet transmitted from the layer 2 switch 303 is registered in correspondence with the port number "P3" in the learned information 311 and forwards the packet only to the port 3, without performing the flooding operation. Thus, the packet is received by the transmitting apparatus 200 and forwarded to the relay network 3.

As explained above, as a result of the path learning process, it is possible to transmit the packet to the intended destination while avoiding the increase in the traffic caused by the flooding operation.

There is, however, a limit to the capacity of each of the layer 2 switches 301 to 303 for storing therein the pieces of learned information 311 to 313. For this reason, the layer 2 switches 301 to 303 have a function of autonomously deleting some part of the pieces of learned information 311 to 313 that has not been used for a period equal to or longer than a certain length of time. This function is called the "aging function".

The aging function is a useful function to effectively utilize the limited storage capacity; however, it sometimes causes an unwanted situation. For example, when a failure has occurred in the relay network 3, and the packet transmission from the Ethernet™ network 1 to the Ethernet™ network 2 is interrupted for a certain period of time, the information related to the terminal devices 101 to 106 that are connected to the Ethernet™ network 1 is deleted from the pieces of learned information 311 to 313 due to the aging function.

When some part of the learned information is lost this way, a large amount of flooding occurs after the communication system has recovered from the failure, and a large load is imposed on the network. The larger the scale of the network is, the larger the load is. In some cases, a new failure may occur because of the load imposed on the network.

Figure 3:
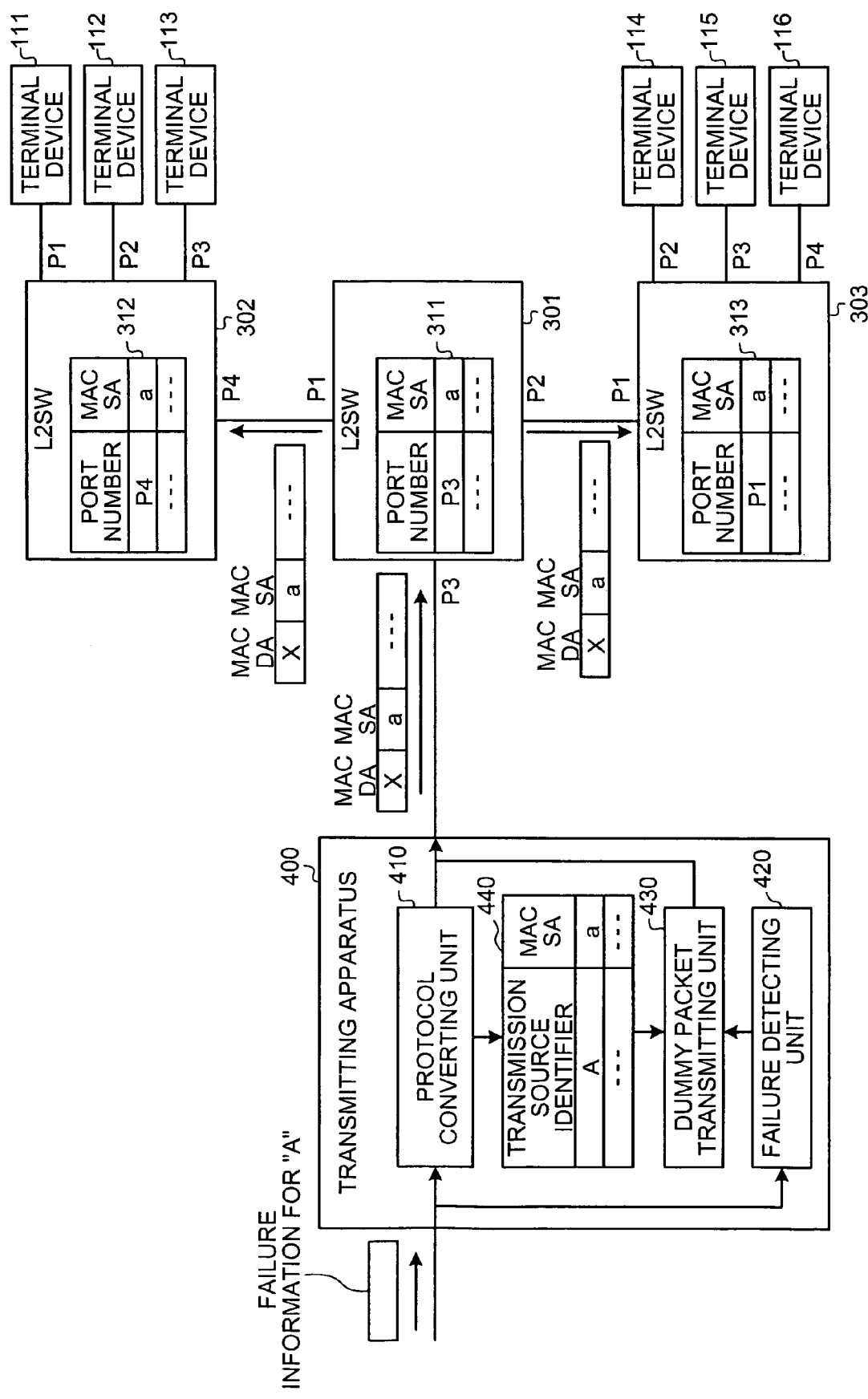
FIG. 3 is a chart for explaining an overview of a method for maintaining learned information according to the first embodiment.

FIG. 3 is a chart for explaining an overview of the method for maintaining the learned information according to the first embodiment. In the method for maintaining the learned information according to the first embodiment, a transmitting apparatus 400 is used in place of the transmitting apparatus 200.

The transmitting apparatus 400 includes a protocol converting unit 410, a failure detecting unit 420, and a dummy-packet transmitting unit 430. In addition to a function of reconstructing a packet for the Ethernet™ with the information that has passed through the relay network 3, the protocol converting unit 410 has a function of bringing a transmission source identifier into correspondence with a MAC SA of the packet after the reconstruction and storing the correspondence information into transmission source information 440.

The transmission source identifier is identification information used for identifying the transmission source in the relay network 3 and may be a transmission source address in the relay network 3, the identification information of the communication path, or the like. When the relay network 3 is an ATM network, the transmission source identifier is one of a virtual path identifier (VPI) and a virtual channel identifier (VCI). When the relay network 3 is a SONET/SDH ring, the transmission source identifier is a channel number.

The failure detecting unit 420 has a function of detecting a failure that has occurred in the relay network 3 and notifying the dummy-packet transmitting unit 430 of the transmission source identifier related to the detected failure. The dummy-packet transmitting unit 430 has a function of obtaining, out of the transmission source information 440, the MAC SA being in correspondence with the transmission source identifier that has been notified from the failure detecting unit 420 and is related to the failure and transmitting a dummy packet in which the obtained MAC SA is specified as its MAC SA to the Ethernet™ network 2.

When the MAC SA is "a" for a packet that has been reconstructed from information transferred via a path of which the VCI is "A", the protocol converting unit 410 brings "A" as a transmission source identifier into correspondence with "a" as a MAC SA and stores the correspondence information into the transmission source information 440. This operation is performed every time the protocol converting unit 410 reconstructs a packet.

In this situation, let us suppose that a failure has occurred in the path of which the VCI is "A" in the relay network 3. In this situation, the packet of which the MAC SA is "a" cannot be transmitted to the Ethernet™ network 2 due to the path failure. In the Ethernet™ network 2, there is a possibility that the learned information related to the MAC SA "a" may be deleted due to the aging function.

To avoid having this possibility, when the failure detecting unit 420 detects that a failure has occurred in the path of which the VCI is "A", the dummy-packet transmitting unit 430 searches the transmitting source information 440 so as to obtain the MAC SA "a" that is in correspondence with the transmission source identifier "A" and transmits a dummy packet in which the MAC SA "a" is specified as its MAC SA to the Ethernet™ network 2.

With this arrangement in which the dummy-packet transmitting unit 430 transmits the dummy packet, it is possible to prevent the learned information from being deleted due to the aging function. However, if the dummy-packet transmitting unit 430 keeps transmitting dummy packets, there is a possibility that, contrary to the desired effect, some inconvenience may be caused. Thus, the dummy-packet transmitting unit 430 is configured to transmit dummy packets only a predetermined number of times or only for a predetermined period of time.

In the following description, an example with a transmitting apparatus that connects an ATM network to an Ethernet™ network will be explained; however, the transmitting apparatus may connect any other combination of networks.

Figure 13:
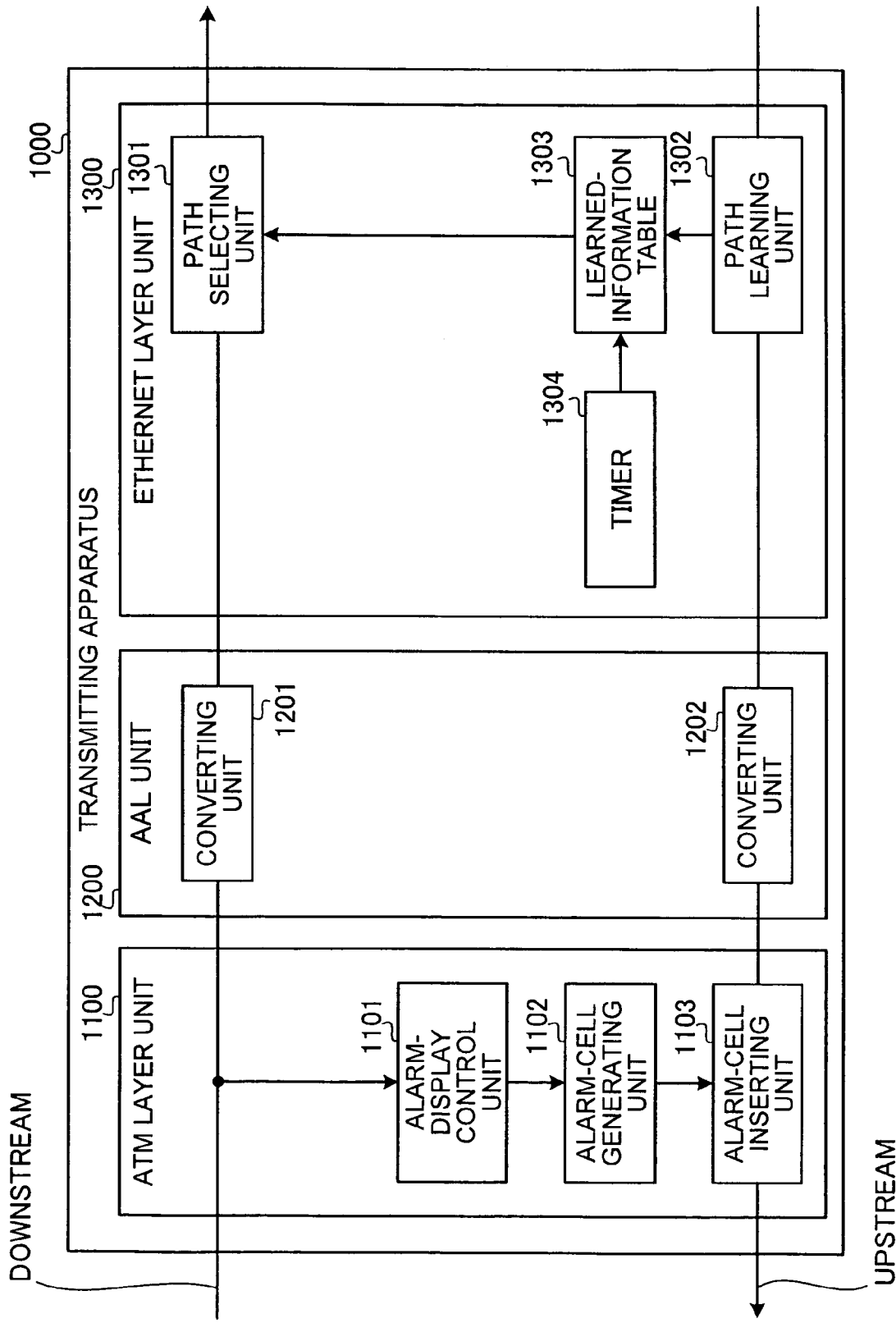
FIG. 13 is a block diagram for showing a configuration of a conventional transmitting apparatus.

FIG. 13 is a block diagram for showing a configuration of a conventional transmitting apparatus 1000. The conventional transmitting apparatus 1000 is a transmitting apparatus that connects an ATM network to an Ethernet™ network and includes an ATM layer unit 1100, an ATM adaptation layer (AAL) unit 1200, and an Ethernet™ layer unit 1300.

In the conventional transmitting apparatus 1000, there are two types of main signals. One is a main signal that flows from the ATM network side to the Ethernet™ network side. The other is a main signal that flows from the Ethernet™ network side to the ATM network side. In the following description, the former will be referred to as a downstream main signal, whereas the latter will be referred to as an upstream main signal.

The ATM layer unit 1100 is a processing unit that exercises control related to the ATM network and includes an alarm-display control unit 1101, an alarm-cell generating unit 1102, and an alarm-cell inserting unit 1103.

The alarm-display control unit 1101 is a control unit that controls detection of failures and responsive actions for the failures in the ATM network, using an operations, administration, and maintenance (OAM) function (i.e. a maintenance and management function) included in the ATM. The detection of failures in the ATM network is realized by checking the contents of alarm cells such as an alarm indication signal (AIS) or a remote defect indication (RDI) that are received by way of downstream main signals.

The alarm-cell generating unit 1102 is a processing unit that generates an alarm cell according to an instruction from the alarm-display control unit 1101. The alarm-cell inserting unit 1103 is a processing unit that inserts the alarm cell generated by the alarm-cell generating unit 1102 into an upstream main signal so that the alarm cell is transmitted into the ATM network.

The AAL unit 1200 is a processing unit that performs a conversion processing required for the exchange of information between the ATM network and the Ethernet™ network and includes a converting unit 1201 and a converting unit 1202. The converting unit 1201 is a processing unit that converts downstream main signals and reconstructs an Ethernet™ packet that has been encapsulated in an ATM cell and transmits the reconstructed Ethernet™ packet to the Ethernet™ network side. The converting unit 1202 is a processing unit that converts upstream main signals and divides an Ethernet™ packet into an encapsulated ATM cell so that the encapsulated ATM cell is transmitted to the ATM network side.

The Ethernet™ layer unit 1300 is a processing unit that exercises control related to the Ethernet™ network and includes a path selecting unit 1301, a path learning unit 1302, a learned-information table 1303, and a timer 1304.

The path selecting unit 1301 is a processing unit that determines through which port (not shown) a packet received by way of a downstream main signal should be output to the Ethernet™ network, by referring to the learned-information table 1303. The path learning unit 1302 is a processing unit that brings a MAC SA of the packet transmitted from the Ethernet™ side by way of an upstream main signal into correspondence with a number assigned to the port (not shown) through which the packet has been received and stores the correspondence information into the learned-information table 1303.

The learned-information table 1303 is a table that stores therein learned information like the pieces of learned information 311 to 313 shown in FIG. 2. The learned-information table 1303 is referred to when the path selecting unit 1301 selects a path. The timer 1304 offers a timekeeping function so that some information that has not been used for a certain period of time is deleted from the learned-information table 1303 with the aging function.

As explained above, like the layer 2 switches 301 to 303 shown in FIG. 2, the Ethernet™ layer unit 1300 has the learned information regarding the paths, which is used for controlling the paths, and also has the aging function.

Figure 4:
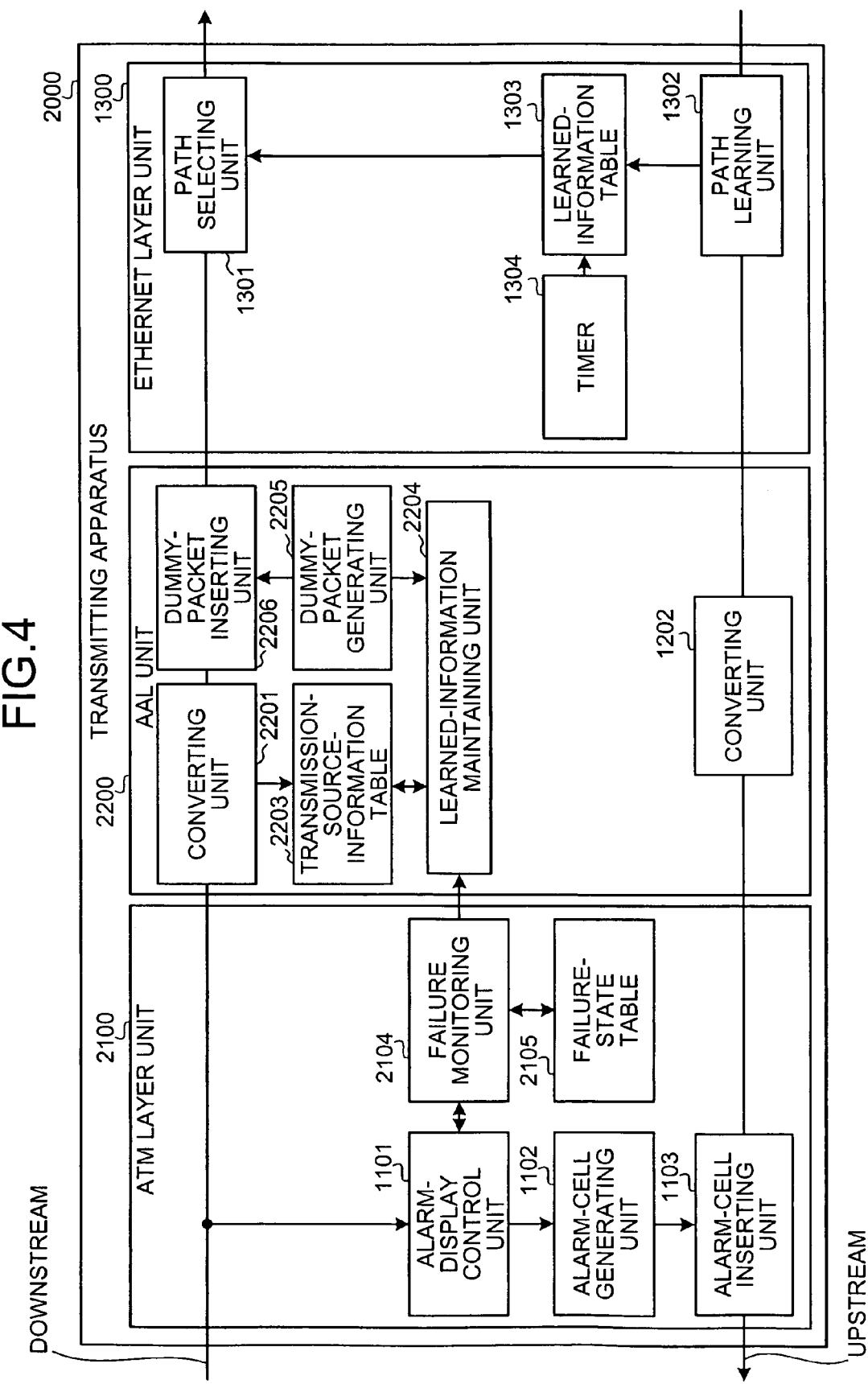
FIG. 4 is a block diagram for showing a configuration of a transmitting apparatus according to the first embodiment.

FIG. 4 is a block diagram for showing a configuration of a transmitting apparatus 2000 according to the first embodiment. The transmitting apparatus 2000 corresponds to the transmitting apparatus 400 shown in FIG. 3. In addition to the functions that are the same as those of the conventional transmitting apparatus 1000, the transmitting apparatus 2000 also has a function of transmitting a dummy packet, when a failure has occurred in the ATM network, to prevent the learned information from being deleted in the Ethernet™ network.

As shown in FIG. 4, the transmitting apparatus 2000 includes an ATM layer unit 2100, an AAL unit 2200, and the Ethernet™ layer unit 1300. The ATM layer unit 2100 is a processing unit that exercises control related to the ATM network and includes the alarm-display control unit 1101, the alarm-cell generating unit 1102, the alarm-cell inserting unit 1103, a failure monitoring unit 2104, and a failure-state table 2105.

The alarm-display control unit 1101, the alarm-cell generating unit 1102, and the alarm-cell inserting unit 1103 are the same as those shown in FIG. 13; therefore, the explanation thereof will be omitted.

The failure monitoring unit 2104 is a processing unit that obtains the status of the ATM network recognized by the alarm-display control unit 1101 and stores the information into the failure-state table 2105. The failure monitoring unit 2104 also performs a processing of scanning the failure-state table 2105 once every certain period of time and notifying a learned-information maintaining unit 2204 included in the AAL unit 2200 of one of the VPI and the VCI of the path in which a failure has occurred.

The failure-state table 2105 is a table in which the state of each of the paths in the ATM network is stored. The state of each of the paths is managed both in units of virtual channel connections (VCCs), which are the smallest units of the paths in the ATM, and in units of virtual path connections (VPCs), which are obtained by putting VCCs together. Thus, the failure-state table 2105 stores therein VCIs in correspondence with the state of VCCs that correspond to the VCIs, and also stores therein VPIs in correspondence with the state of VPCs that correspond to the VPIs.

The AAL unit 2200 is a processing unit that performs a conversion processing required for the exchange of information between the ATM network and the Ethernet™ network and includes a converting unit 2201, the converting unit 1202, a transmission-source-information table 2203, the learned-information maintaining unit 2204, a dummy-packet generating unit 2205, and a dummy-packet inserting unit 2206. The converting unit 1202 is the same as the one shown in FIG. 13; therefore, the explanation thereof will be omitted.

The converting unit 2201 is a processing unit that converts downstream main signals and reconstructs an Ethernet™ packet that has been encapsulated in an ATM cell and transmits the reconstructed Ethernet™ packet to the Ethernet™ network side. The converting unit 2201 also performs a processing of combining one of the VPI and the VCI of the path through which the ATM cell has passed with the MAC SA specified in the reconstructed packet and storing the combined information into the transmission-source-information table 2203.

The transmission-source-information table 2203 is a table into which, every time the converting unit 2201 converts an ATM cell into an Ethernet™ packet, correspondence information that shows one of the VPI and the VCI of the path through which the ATM cell has passed in correspondence with the MAC SA specified in the packet after the conversion is stored. To make searches faster, it is acceptable to have the transmission-source-information table 2203 stored in a content addressable memory (CAM).

Figure 5:
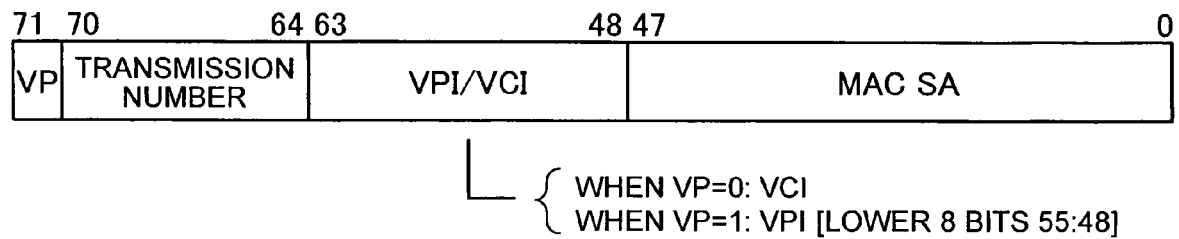
FIG. 5 is a drawing for showing an example of a data format of a transmission-source-information table.

FIG. 5 is a drawing for showing an example of a data format of the transmission-source-information table 2203. As shown in the drawing, for each data, the transmission-source-information table 2203 includes items such as a virtual path (VP), a number of transmissions, a VPI/VCI, and a MAC SA. The VP is a flag that is set to 1 when the value specified in the item of the VPI/VCI is a VPI and is set to 0 when the value specified in the item of the VPI/VCI is a VCI. The number of transmissions is an item for storing therein how many times a dummy packet in which the MAC SA stored in the data is specified as its MAC SA has been transmitted. The initial value of the number of transmissions is set to "0", and every time a dummy packet is transmitted, the number of transmissions is incremented by 1.

The VPI/VCI is an item for storing therein one of the VPI and the VCI of the path through which the ATM cell has passed. When the value of the VP is 1, the item stores therein a VPI, and when the value of the VP is 0, the item stores therein a VCI. The MAC SA is an item for storing therein the MAC SA specified in the packet after the conversion.

Returning to the description of FIG. 4, the learned-information maintaining unit 2204 is a processing unit that performs a processing for maintaining the learned information, using a notification of a failure from the failure monitoring unit 2104 as a trigger.

When having been notified by the failure monitoring unit 2104 of one of the VPI and the VCI of a path in which a failure has occurred, the learned-information maintaining unit 2204 searches the transmission-source-information table 2203 for data that corresponds to one of the VPI and the VCI having been notified. When having found the corresponding data, the learned-information maintaining unit 2204 increments the number of transmissions of the data by 1, and forwards the MAC SA specified in the data to the dummy-packet generating unit 2205 so that a dummy packet is generated.

Further, when the number of transmissions specified in the data is found to be larger than a predetermined threshold value, the learned-information maintaining unit 2204 deletes the data from the transmission-source-information table 2203 without having a dummy packet generated, so that the number of transmissions of the dummy packet is limited to the predetermined number.

Figure 6:
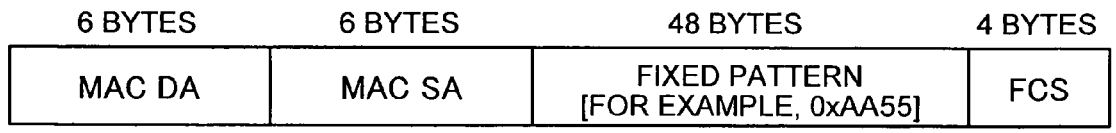
FIG. 6 is a drawing for showing an example of a format of a dummy packet.

The dummy-packet generating unit 2205 is a processing unit that generates a dummy packet, as shown in FIG. 6, in which the MAC address forwarded by the learned-information maintaining unit 2204 is specified as its MAC SA and forwards the generated dummy packet to the dummy-packet inserting unit 2206. A broadcast address is specified as the MAC DA in the dummy packet, so that the single dummy packet is transferred throughout the entire Ethernet™ network.

The format of the dummy packet shown in FIG. 6 is a simple example. For example, it is acceptable to configure a dummy packet so as to include a field related to a virtual local area network (VLAN). Further, instead of specifying the broadcast address as the MAC DA in the dummy packet, it is also acceptable to individually specify a MAC address stored in the learned-information table 1303 included in the Ethernet™ layer unit 1300 or a MAC address that has been selected in advance so that the number of transfer targets is the smallest.

The dummy-packet inserting unit 2206 is a processing unit that inserts the dummy packet generated by the dummy-packet generating unit 2205 into a downstream main signal and transmits the dummy packet into the Ethernet™ network. The Ethernet™ layer unit 1300 is the same as the one shown in FIG. 13; therefore, the explanation thereof will be omitted.

Figure 7:
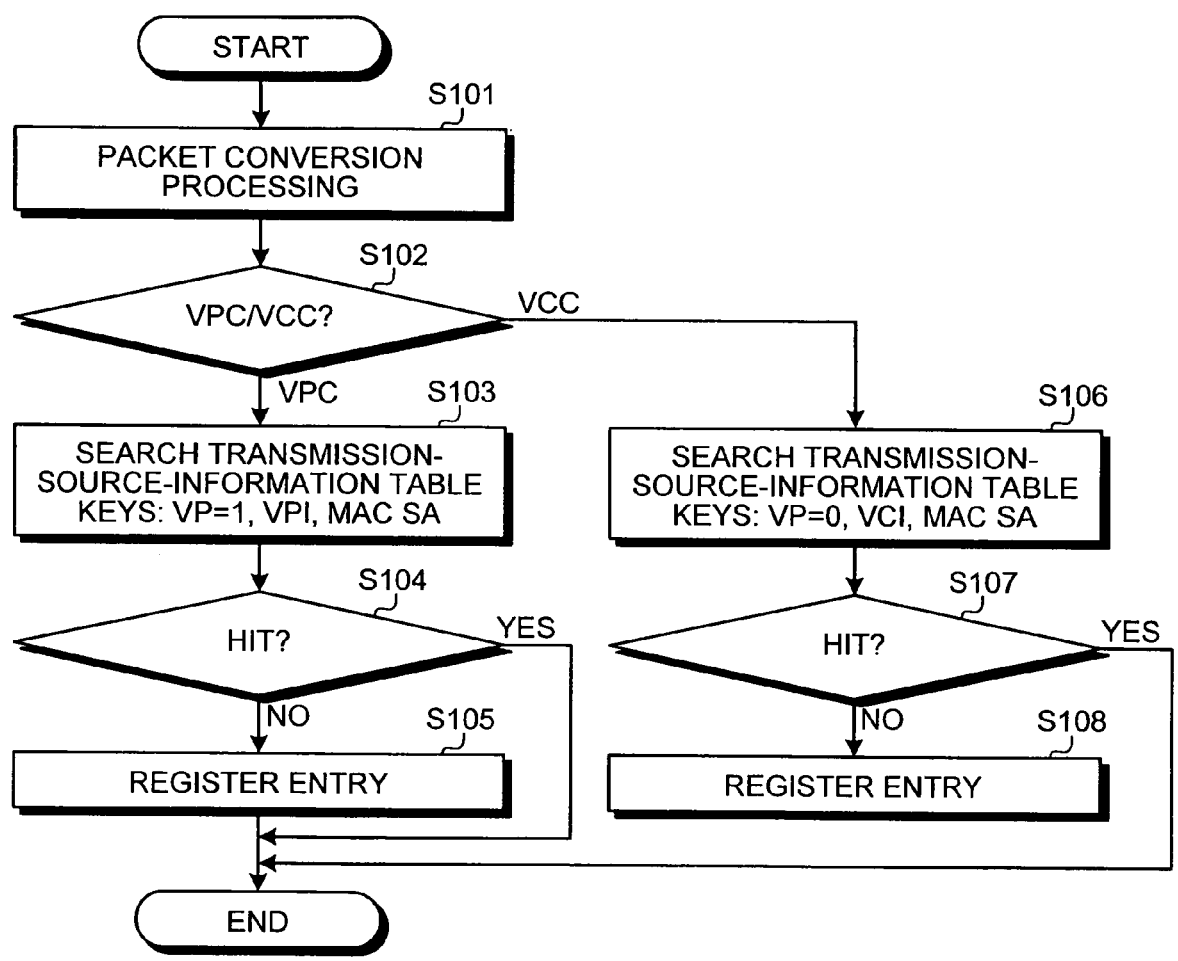
FIG. 7 is a flowchart for showing a processing procedure in an updating processing for a transmission-source-information table.

FIG. 7 is a flowchart for showing the processing procedure in the updating processing for the transmission-source-information table 2203. This processing is performed every time the converting unit 2201 converts an ATM cell into an Ethernet™ packet.

After the converting unit 2201 converts a packet (step S101), if the connection between the Ethernet™ networks is managed with the VPC (step S102: VPC), the converting unit 2201 searches the transmission-source-information table 2203 for data in which the VP value is 1 and also in which the VPI value and the MAC SA value are the same (step S103). When no such data exists (step S104: No), a data is added (step S105). When such data already exists (step S104: Yes), no processing is performed.

If the connection between the Ethernet™ networks is managed with the VCC (step S102: VCC), the converting unit 2201 searches the transmission-source-information table 2203 for data in which the VP value is 0 and also in which the VCI value and the MAC SA value are the same (step S106). When no such data exists (step S107: No), a data is added (step S108). When such data already exists (step S107: Yes), no processing is performed.

Figure 8:
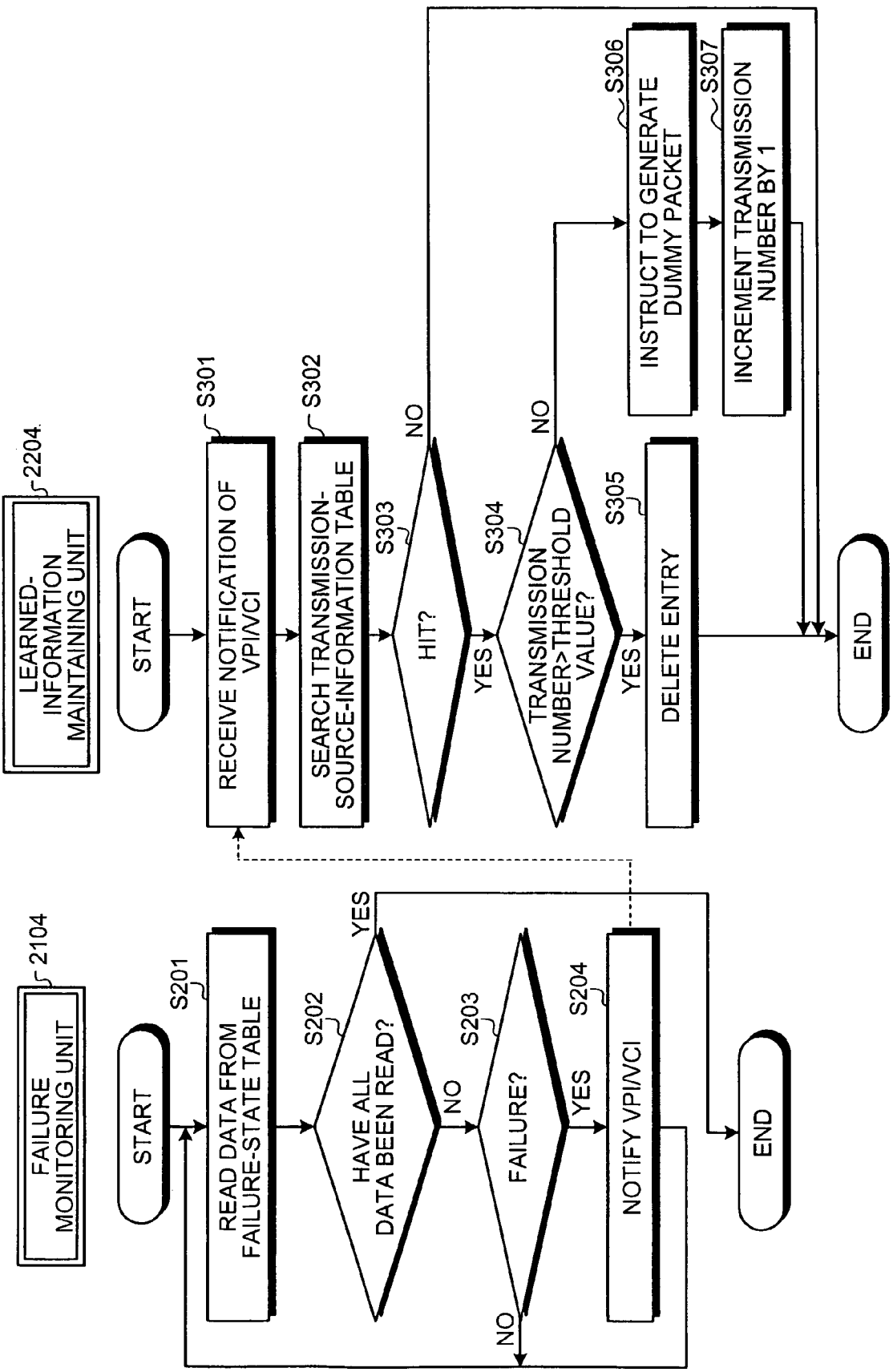
FIG. 8 is a flowchart for showing a processing procedure performed by a failure monitoring unit and a learned-information maintaining unit.

FIG. 8 is a flowchart for showing the processing procedure performed by the failure monitoring unit 2104 and the learned-information maintaining unit 2204. The failure monitoring unit 2104 performs the processing shown in the drawing once every certain period of time. The learned-information maintaining unit 2204 performs the processing shown in the drawing every time the learned-information maintaining unit 2204 receives a notification from the failure monitoring unit 2104.

The failure monitoring unit 2104 reads a data from the failure-state table 2105 (step S201). If all the data have been read from the failure-state table 2105 (step S202: Yes), the processing is ended.

If not all the data have been read from the failure-state table 2105, in other words, if a piece of valid data has been read from the failure-state table 2105 at step S201 (step S202: No), the failure monitoring unit 2104 checks whether the data that has been read indicates that a failure has occurred in one of the VPC and the VCC.

When the data that has been read does not indicate that a failure has occurred in the one of the VPC and the VCC (step S203: No), the procedure returns to step S201, and the failure monitoring unit 2104 makes an attempt to read a next data.

On the other hand, when the data that has been read indicates that a failure has occurred in the one of the VPC and the VCC (step S203: Yes), the failure monitoring unit 2104 notifies the learned-information maintaining unit 2204 of the one of the VPI and the VCI that is specified in the data having been read (step S204). Subsequently, the procedure returns to step S201, and the failure monitoring unit 2104 makes an attempt to read a next data.

When having been notified by the failure monitoring unit 2104 of the one of the VPI and the VCI (step S301), the learned-information maintaining unit 2204 searches the transmission-source-information table 2203, using the one of the VPI and the VCI having been notified as a key (step S302). In this situation, when no corresponding data exists (step S303: No), the processing is ended.

When such a corresponding data exists (step S303), if the number of transmissions specified in the corresponding data is larger than a predetermined threshold value (step S304: Yes), the learned-information maintaining unit 2204 deletes the corresponding data (step S305). If the number of transmissions specified in the corresponding data is equal to or smaller than the predetermined threshold value (step S304: No), the learned-information maintaining unit 2204 forwards the MAC SA specified in the data to the dummy-packet generating unit 2205 so as to have a dummy packet generated (step S306), and the number of transmissions is incremented by 1 (step S307).

When there are plural data that correspond, and the number of transmissions specified in each of these data is equal to or smaller than the threshold value, the MAC SA included in each of these data is forwarded to the dummy-packet generating unit 2205 so that a dummy packet is generated for each MAC SA.

According to the first embodiment, the converting unit 2201 stores the correspondence information between the VPI/VCIs and the MAC SAs into the transmission-source-information table 2203. When having been notified by the failure monitoring unit 2104 of the VPI/VCI of the path in which a failure has occurred, the learned-information maintaining unit 2204 checks the transmission-source-information table 2203 for the notified VPI/VCI and has a dummy packet transmitted to the MAC SA having been obtained. Thus, when a failure has occurred in the ATM network, it is possible to prevent the learned information from being deleted improperly due to the aging function.

Further, it is possible to realize the method for maintaining the learned information according to the first embodiment by replacing any transmitting apparatus that connects an Ethernet™ network to another network with the transmitting apparatus according to the first embodiment. Accordingly, there is no need to apply modifications to various types of devices such as switches that are included in the Ethernet™ network. Thus, it is possible to introduce this method at a low cost and with ease.

In the description of the first embodiment, the example in which the mechanism for preventing the learned information from being deleted in the Ethernet™ network when a failure has occurred in the ATM network is provided on the ATM side of the transmitting apparatus 2000 is explained. In the description of a second embodiment of the present invention, an example in which the mechanism is provided on the Ethernet™ side will be explained.

Firstly, the configuration of the transmitting apparatus according to the second embodiment will be explained. In the following description, an example with a transmitting apparatus that connects an ATM network to an Ethernet™ network will be explained; however, the transmitting apparatus may connect any other combination of networks.

Figure 9:
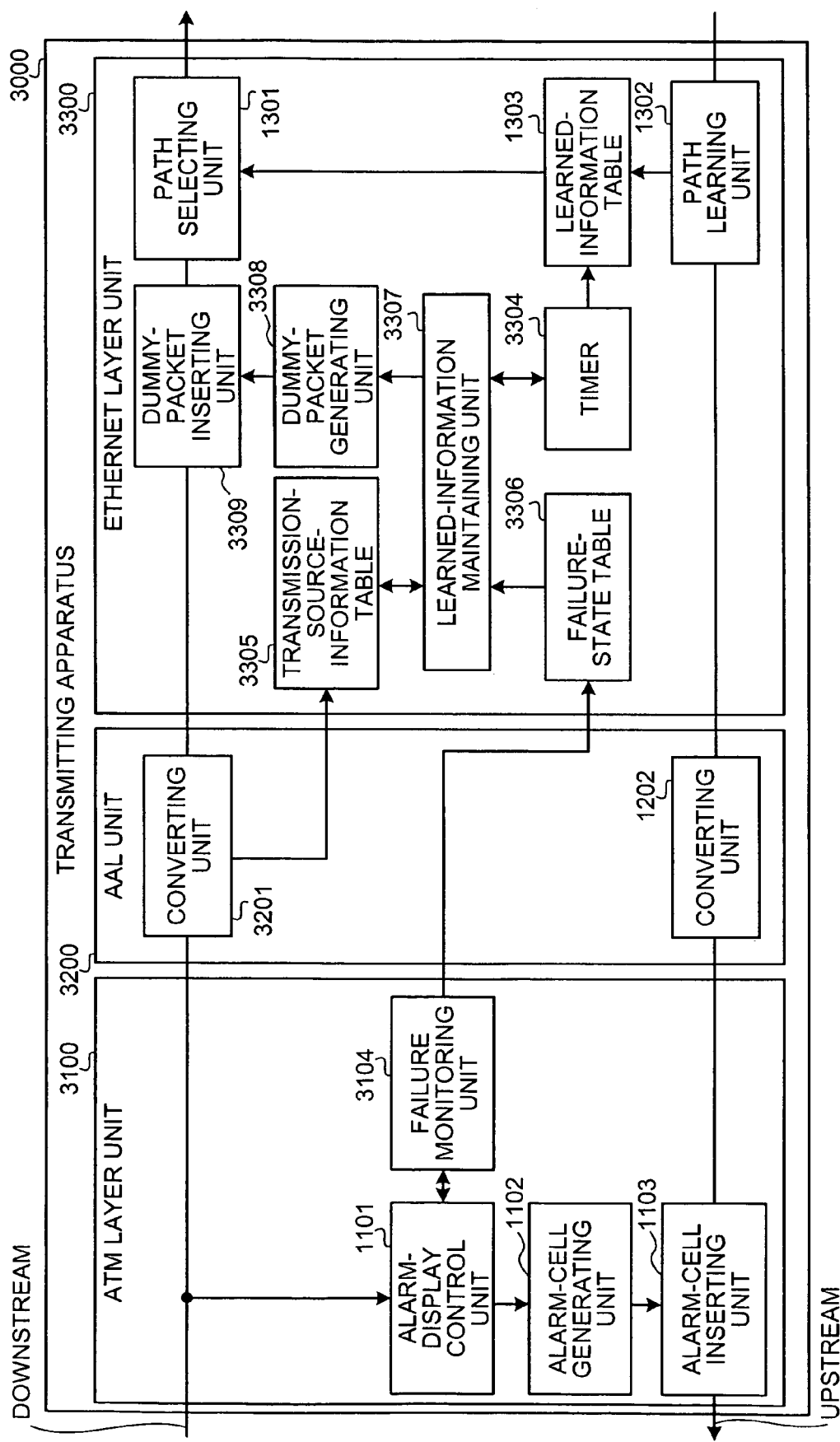
FIG. 9 is a block diagram for showing a configuration of a transmitting apparatus according to a second embodiment of the present invention.

FIG. 9 is a block diagram for showing a configuration of a transmitting apparatus 3000 according to the second embodiment. The transmitting apparatus 3000 includes an ATM layer unit 3100, an AAL unit 3200, and an Ethernet™ layer unit 3300. The ATM layer unit 3100 is a processing unit that exercises control related to the ATM network and includes the alarm-display control unit 1101, the alarm-cell generating unit 1102, the alarm-cell inserting unit 1103, and a failure monitoring unit 3104.

The alarm-display control unit 1101, the alarm-cell generating unit 1102, and the alarm-cell inserting unit 1103 are the same as those shown in FIG. 13; therefore, the explanation thereof will be omitted. The failure monitoring unit 3104 is a processing unit that obtains the status of the ATM network recognized by the alarm-display control unit 1101 and stores the information of the path in which a failure has occurred into a failure-state table 3306, which will be described later, via a route provided between the failure monitoring unit: 3104 and the Ethernet™ layer unit 3300.

The AAL unit 3200 is a processing unit that performs a conversion processing required for the exchange of information between the ATM network and the Ethernet™ network and includes a converting unit 3201 and the converting unit 1202. The converting unit 1202 is the same as the one shown in FIG. 13; therefore, the explanation thereof will be omitted.

The converting unit 3201 is a processing unit that converts downstream main signals and reconstructs an Ethernet™ packet that has been encapsulated in an ATM cell and transmits the reconstructed Ethernet™ packet to the Ethernet™ network side. The converting unit 3201 also performs a processing of combining one of the VPI and the VCI of the path through which the ATM cell has passed with the MAC SA specified in the reconstructed packet and storing the combined information into a transmission-source-information table 3305, which will be described later, via a route provided between the converting unit 3201 and the Ethernet™ layer unit 3300.

The Ethernet™ layer unit 3300 is a processing unit that exercises control related to the Ethernet™ network and includes the path selecting unit 1301, the path learning unit 1302, the learned-information table 1303, a timer 3304, the transmission-source-information table 3305, the failure-state table 3306, a learned-information maintaining unit 3307, a dummy-packet generating unit 3308, and a dummy-packet inserting unit 3309.

The path selecting unit 1301, the path learning unit 1302, and the learned-information table 1303 are the same as the ones shown in FIG. 13; therefore, the explanation thereof will be omitted. The timer 3304 offers a timekeeping function so that some information that has not been used for a certain period of time is deleted from the learned-information table 1303 with the aging function. The timer 3304 also offers a timekeeping function so that the learned-information maintaining unit 3307 performs the processing for maintaining the learned information once every certain period of time.

The transmission-source-information table 3305 is a table in which, according to the control exercised by the converting unit 3201, a set of one of the VPI and the VCI of the path through which the ATM cell has passed and the MAC SA specified in the packet after the conversion is stored, for example. The transmission-source-information table 3305 stores therein data that is the same as the one stored in the transmission-source-information table 2203 shown in FIG. 4.

The failure-state table 3306 is a table that, according to the control exercised by the failure monitoring unit 3104, stores therein identification information of the path in which a failure has occurred in the ATM network together with an update time. The update time is managed for each of the pieces of identification information of the paths. In a path that corresponds to a piece of identification information, the failure is considered to continue for a predetermined period of time after the update time.

The learned-information maintaining unit 3307 is a processing unit that performs the processing for maintaining the learned information, using an activation instruction that is regularly transmitted from the timer 3304 as a trigger.

When having received an activation instruction from the timer 3304, the learned-information maintaining unit 3307 reads data, one by one, from the transmission-source-information table 3305. The learned-information maintaining unit 3307 then searches the failure-state table 3306, using one of the VPI and the VCI of the read data as a key, and checks if a failure has occurred in the path that corresponds to the read data.

In this situation, when it is found out that a failure has occurred in the path, if the number of transmissions specified in the read data is equal to or smaller than a predetermined threshold value, the learned-information maintaining unit 3307 forwards the MAC SA specified in the data to the dummy-packet generating unit 3308 so as to have a dummy packet generated and increments the number of transmissions by 1. Further, the learned-information maintaining unit 3307 transmits an instruction to the timer 3304 so that the aging function is stopped for a predetermined period of time, and thereby prevents the learned information stored in the learned-information table 1303 from being deleted.

If the number of transmissions specified in the read data exceeds the predetermined threshold value, the learned-information maintaining unit 3307 deletes the read data from the transmission-source-information table 3305, without having a dummy packet generated, so that the number of transmissions of the dummy packet is limited to the predetermined number.

The dummy-packet generating unit 3308 is a processing unit that generates a dummy packet in which the MAC address forwarded by the learned-information maintaining unit 3307 is specified as its MAC SA and forwards the generated dummy packet to the dummy-packet inserting unit 3309. The dummy-packet generating unit 3308 is the same type of processing unit as the dummy-packet generating unit 2205 shown in FIG. 4.

The dummy-packet inserting unit 3309 is a processing unit that inserts the dummy packet generated by the dummy-packet generating unit 3308 into a downstream main signal and transmits the dummy packet into the Ethernet™ network. The dummy-packet inserting unit 3309 is the same type of processing unit as the dummy-packet inserting unit 2206 shown in FIG. 4.

Figure 10:
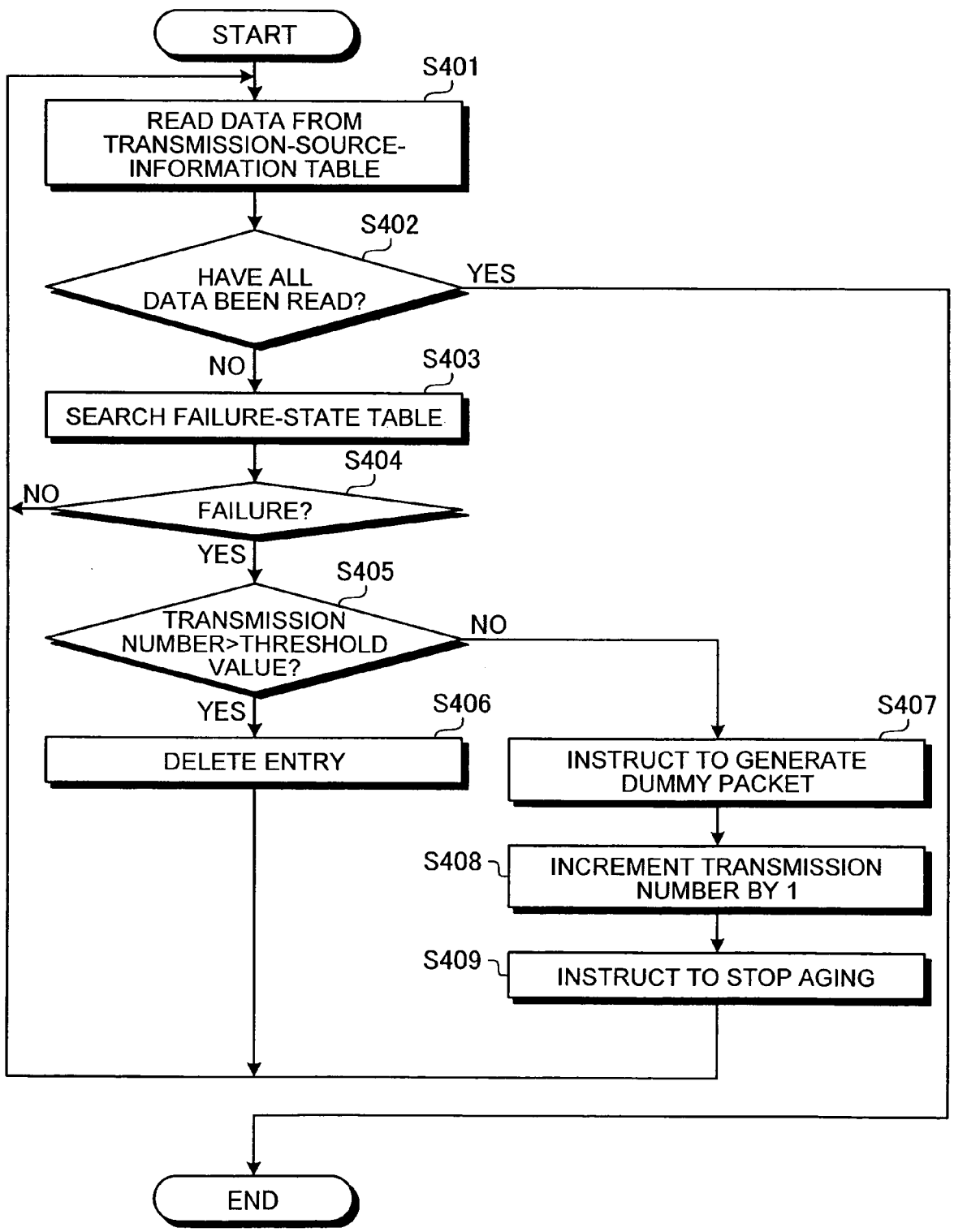
FIG. 10 is a flowchart for showing a processing procedure performed by a learned-information maintaining unit.

FIG. 10 is a flowchart for showing the processing procedure performed by the learned-information maintaining unit 3307. The learned-information maintaining unit 3307 performs the processing shown in the drawing every time the learned-information maintaining unit 3307 receives an activation instruction, which is transmitted from the timer 3304 once every certain period of time.

The learned-information maintaining unit 3307 reads a data from the transmission-source-information table 3305 (step S401). If all the data have been read from the transmission-source-information table 3305 (step S402: Yes), the processing is ended.

If not all the data have been read from the transmission-source-information table 3305, in other words, if a piece of valid data has been read from the transmission-source-information table 3305 at step S401 (step S402: No), the learned-information maintaining unit 3307 searches the failure-state table 3306, using one of the VPI and the VCI of the read data as a key (step S403).

In this situation, when the data found in the search does not indicate that a failure has occurred in the one of the VPC and the VCC (step S404: No), the procedure returns to step S401, and the learned-information maintaining unit 3307 reads a next data from the transmission-source-information table 3305.

On the other hand, when the data found in the search indicates that a failure has occurred in the one of the VPC and the VCC (step S404: Yes), the learned-information maintaining unit 3307 checks the number of transmissions specified in the data read at step S401.

In this situation, when the number of transmissions is larger than the predetermined threshold value (step S405: Yes), the learned-information maintaining unit 3307 deletes the data read at step S401 (step S406). When the number of transmissions is equal to or smaller than the predetermined threshold value (step S405: No), the learned-information maintaining unit 3307 forwards the MAC SA specified in the data that has been read at step S401 to the dummy-packet generating unit 3308 so as to have a dummy packet generated (step S407). The learned-information maintaining unit 3307 increments the number of transmissions by 1 (step S408), and transmits an instruction that the aging function should be stopped to the timer 3304 (step S409).

As explained above, the mechanism for preventing the learned information from being deleted in the Ethernet™ network when a failure has occurred in the ATM network may be provided on the Ethernet™ side of the transmitting apparatus. This configuration has a high level of general versatility because most part of the Ethernet™ layer unit 3300 can be used without modification when, for example, the same mechanism is included in a transmitting apparatus that connects a SONET/SDH to an Ethernet™ network.

In the description of the second embodiment, the example in which the mechanism for preventing the learned information from being deleted in the Ethernet™ when a failure has occurred in the ATM network is provided on the Ethernet™ side of the transmitting apparatus 3000 is explained.

The configuration of the transmitting apparatus 3000 according to the second embodiment requires that special routes are provided between the ATM layer unit and the Ethernet™ layer unit and between the AAL unit and the Ethernet™ layer unit so that information is transferred via the routes. Thus, there is a possibility that the structure of the apparatus becomes complicated and the cost of the apparatus increases.

In view of this problem, in the description of a third embodiment of the present invention, an example in which the mechanism for preventing the learned information from being deleted in the Ethernet™ network when a failure has occurred in the ATM network is provided on the Ethernet™ side of a transmitting apparatus, without having to provide special routes for transferring information, will be explained.

Firstly, the configuration of the transmitting apparatus according to the third embodiment will be explained. In the following description, an example with a transmitting apparatus that connects an ATM network to an Ethernet™ network will be explained; however, the transmitting apparatus may connect any other combination of networks.

Figure 11:
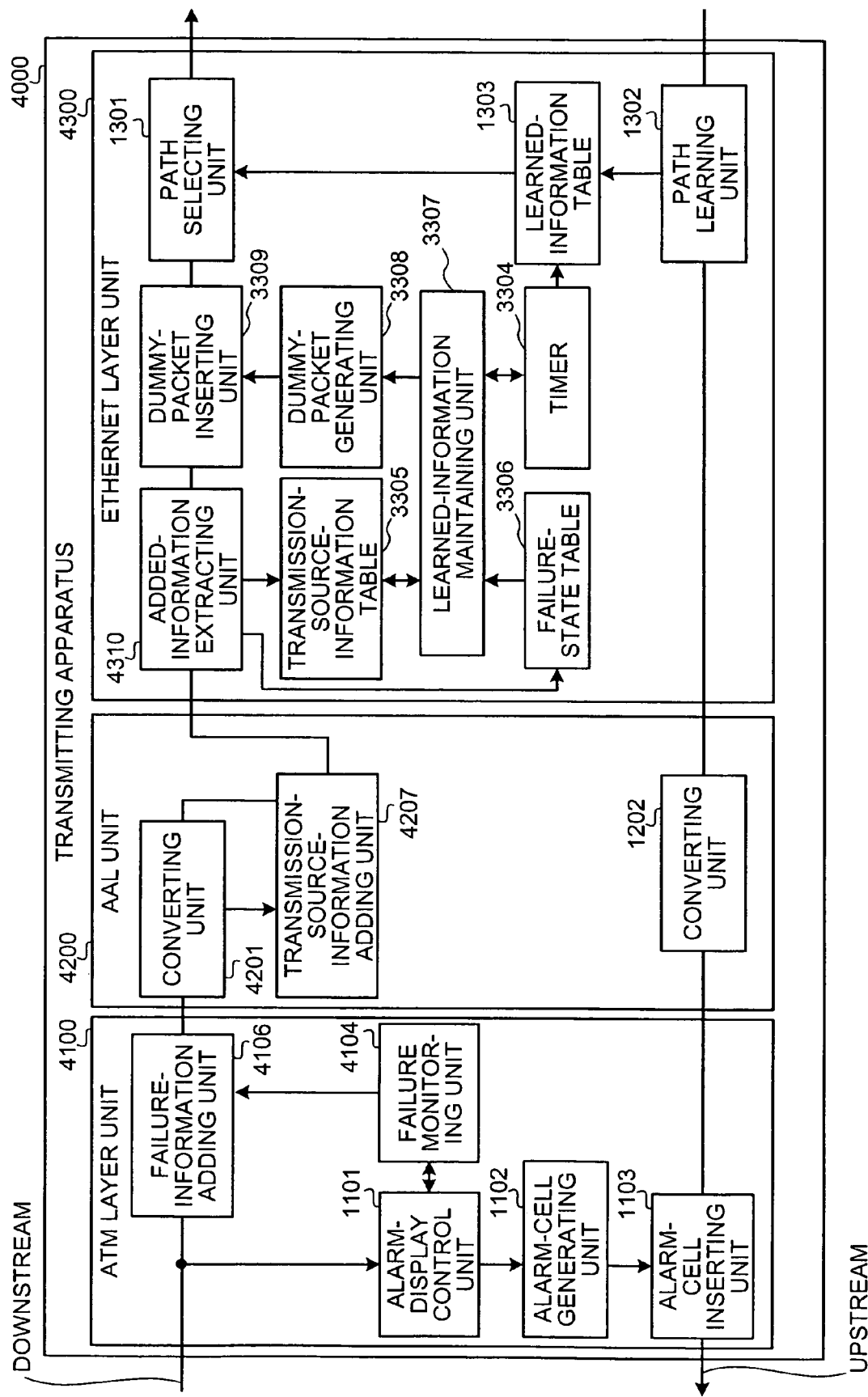
FIG. 11 is a block diagram for showing a configuration of a transmitting apparatus according to a third embodiment of the present invention.

FIG. 11 is a block diagram for showing a configuration of a transmitting apparatus 4000 according to the third embodiment. The transmitting apparatus 4000 includes an ATM layer unit 4100, an AAL unit 4200, and an Ethernet™ layer unit 4300. The ATM layer unit 4100 is a processing unit that exercises control related to the ATM network and includes the alarm-display control unit 1101, the alarm-cell generating unit 1102, the alarm-cell inserting unit 1103, a failure monitoring unit 4104, and a failure-information adding unit 4106.

The alarm-display control unit 1101, the alarm-cell generating unit 1102, and the alarm-cell inserting unit 1103 are the same as those shown in FIG. 13; therefore, the explanation thereof will be omitted. The failure monitoring unit 4104 is a processing unit that obtains the status of the ATM network recognized by the alarm-display control unit 1101 and notifies the failure-information adding unit 4106 of the one of the VPI and the VCI of a path in which a failure has occurred.

The failure-information adding unit 4106 is a processing unit that adds items in predetermined formats to an ATM cell that flows in a downstream main signal and, if having been notified by the failure monitoring unit 4104 of one of the VPI and the VCI, embeds the one of the VPI and the VCI having been notified into an added portion.

The AAL unit 4200 is a processing unit that performs a conversion processing required for the exchange of information between the ATM network and the Ethernet™ network and includes a converting unit 4201, the converting unit 1202, and a transmission-source-information adding unit 4207. The converting unit 1202 is the same as the one shown in FIG. 13; therefore, the explanation thereof will be omitted.

The converting unit 4201 is a processing unit that converts downstream main signals and reconstructs an Ethernet™ packet that has been encapsulated in an ATM cell and transmits the reconstructed Ethernet™ packet to the Ethernet™ network side. The converting unit 4201 also adds the items in the predetermined formats to the reconstructed packet and, if one of the VPI and the VCI is embedded in the added portion of the ATM cell by the failure-information adding unit 4106, the converting unit 4201 embeds the one of the VPI and the VCI into the added portion of the packet.

The converting unit 4201 also notifies the transmission-source-information adding unit 4207 of one of the VPI and the VCI of the path through which the ATM cell has passed. The transmission-source-information adding unit 4207 is a processing unit that embeds the one of the VPI and the VCI that has been notified by the converting unit 4201 into the added portion added to the packet by the converting unit 4201.

Figure 12:
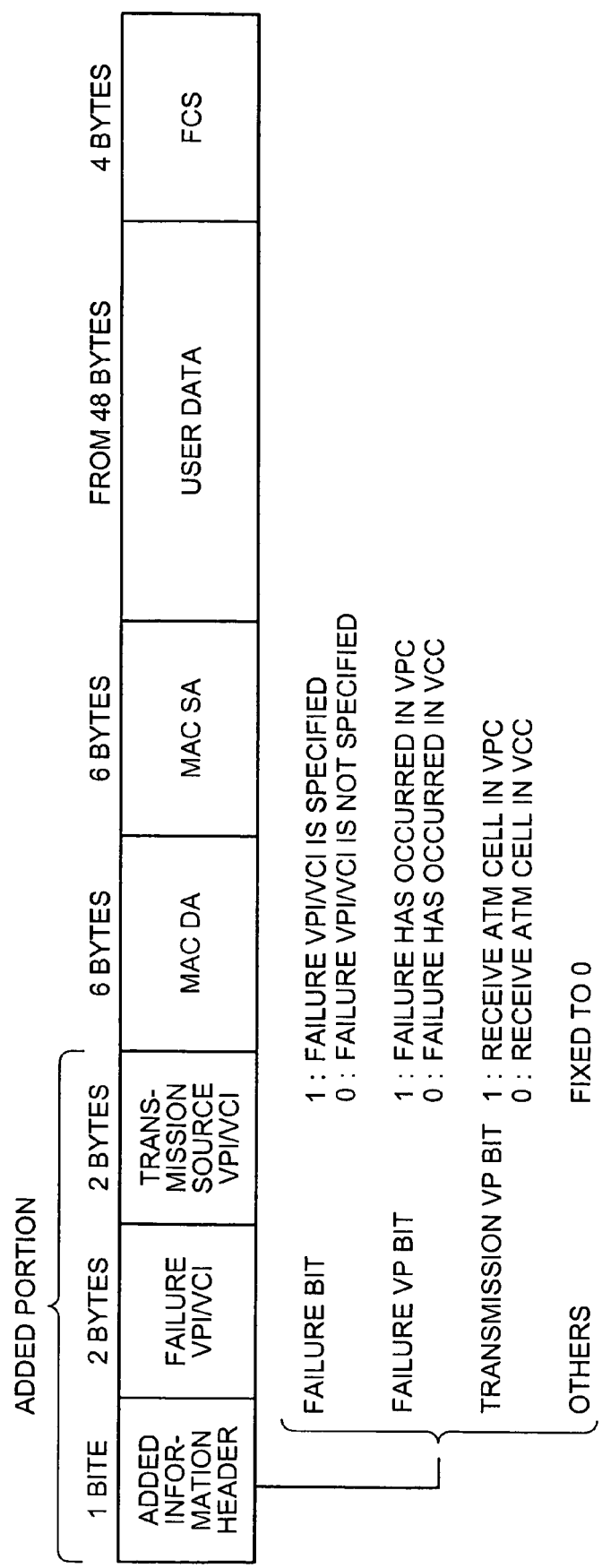
FIG. 12 is a drawing for showing an example of a format of a packet transferred within a transmitting apparatus.

The format of the packet to which the items are added by the converting unit 4201 is shown in FIG. 12. As shown in the drawing, the converting unit 4201 adds three items such as added information header, a failure VPI/VCI, and a transmission source VPI/VCI to the head of the packet after the reconstruction.

The failure VPI/VCI is an item in which the one of the VPI and the VCI that has been notified by the failure monitoring unit 4104 to the failure-information adding unit 4106 is specified, in other words, an item in which one of the VPI and the VCI that indicates the path in which a failure has occurred is specified. When neither of a VPI and a VCI has been notified by the failure monitoring unit 4104 to the failure-information adding unit 4106, this item is not used.

Whether one of the VPI and the VCI of the path in which a failure has occurred is specified in the item of the failure VPI/VCI is judged depending on the value in the failure bit in the added information header. When one of the VPI and the VCI of the path in which a failure has occurred is specified in the item of the failure VPI/VCI, whether the specified value is the VPI or the VCI is judged depending on the value in the failure VP bit in the added information header.

The transmission source VPI/VCI is an item in which one of the VPI and the VCI that has been notified by the converting unit 4201 to the transmission-source-information adding unit 4207 is specified, in other words, an item in which one of the VPI and the VCI that indicates the path through which the ATM cell before the conversion has passed is specified. One of the VPI and the VCI is always specified in the item of the transmission source VPI/VCI. Whether the value specified in the item of the transmission source VPI/VCI is the VPI or the VCI is judged depending on the value in the transmission VP bit in the added information header.

As for the correspondence relationship between the packet after the reconstruction and the added items, the failure VPI/VCI is specified regardless of the packet after the reconstruction, whereas the transmission source VPI/VCI is specified so as to indicate one of the VPI and the VCI of the path through which the reconstructed packet has passed before the reconstruction.

The Ethernet™ layer unit 4300 is a processing unit that exercises control related to the Ethernet™ network and includes the path selecting unit 1301, the path learning unit 1302, the learned-information table 1303, the timer 3304, the transmission-source-information table 3305, the failure-state table 3306, the learned-information maintaining unit 3307, the dummy-packet generating unit 3308, the dummy-packet inserting unit 3309, and an added-information extracting unit 4310.

The path selecting unit 1301, the path learning unit 1302, and the learned-information table 1303 are the same as the ones shown in FIG. 13; therefore, the explanation thereof will be omitted. The timer 3304, the transmission-source-information table 3305, the failure-state table 3306, the learned-information maintaining unit 3307, the dummy-packet generating unit 3308, and the dummy-packet inserting unit 3309 are the same as the ones shown in FIG. 9; therefore, the explanation thereof will be omitted.

The added-information extracting unit 4310 is a processing unit that removes the added items from a packet that passes in the downstream main signal and updates the transmission-source-information table 3305 and the failure-state table 3306, according to the information specified in the removed added items, and the like. An added-information extracting unit 4301 updates the transmission-source-information table 3305, using the transmission source VPI/VCI and the MAC SA. When the failure VPI/VCI is specified, the added-information extracting unit 4301 updates the failure-state table 3306, using the specified failure VPI/VCI.

By referring to the transmission-source-information table 3305 and the failure-state table 3306 that have been updated this way, the learned-information maintaining unit 3307 performs the processing for maintaining the learning information according to the same processing procedure as the one shown in FIG. 10.

As explained above, according to the third embodiment, the transfer of the information between the ATM layer unit and the Ethernet™ layer unit and between the AAL unit and the Ethernet™ layer unit is realized by adding information to the ATM cell and the packet that pass in the main signals. Accordingly, it is possible to provide, on the Ethernet™ side of the transmitting apparatus, the mechanism for preventing the learned information from being deleted in the Ethernet™ network when a failure has occurred in the ATM network, without having to provide special routes for transferring information.

Instead of the arrangement in which the information is transferred by adding the items to the ATM cell and the packet that pass in the main signals, another arrangement is also acceptable in which an ATM cell or a packet for transferring the information is inserted into the main signals.

According to an embodiment of the present invention, when a path failure has occurred in the network of the second network, a dummy packet that is the same as the one that has been transmitted from the second network is transmitted to the first network, using the information being stored in advance. Thus, an effect is achieved where it is possible to prevent the learned information from being deleted improperly in the first network due to the path failure that has occurred in the second network.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmitting apparatus for connecting a first network to a second network, the first network having a function of storing information including a source address specified in a packet as learned information and using the learned information for controlling a path and a function of deleting information not used for a predetermined time from the learned information, the transmitting apparatus comprising:
a protocol converting unit that converts data transmitted from the second network to the first network into a packet in a format transferable in the first network, the packet including a source address of the data;
a storage unit that stores the source address of the data included in the packet and identification information for identifying a path for the data in the second network in a corresponding manner;
a failure detecting unit that detects a failure path in the second network in which a failure has occurred;
a determining unit that determines whether identification information of the failure path detected by the failure detecting unit is stored in the storage unit or not;
a dummy-packet generating unit that generates a dummy packet in which the source address of the data corresponding to the failure path is specified as a source address of the dummy packet, only when the determining unit determines that the identification information of the failure path is stored in the storage unit; and
a dummy-packet transmitting unit that transmits the dummy packet generated by the dummy-packet generating unit to the first network.

2. The transmitting apparatus according to claim 1, wherein
the dummy-packet transmitting unit transmits the dummy packet in which a broadcast address is specified as a destination address to the first network.

3. The transmitting apparatus according to claim 1, wherein
the dummy-packet transmitting unit transmits the dummy packet in which a source address included in learned information stored in the transmitting apparatus is individually specified as the destination address to the first network.

4. The transmitting apparatus according to claim 1, wherein
after transmitting the dummy packet a predetermined number of times with a failure as a triggering point, the dummy-packet transmitting unit stops transmitting the dummy packet even if the failure is not resolved.

5. The transmitting apparatus according to claim 1, wherein
after transmitting the dummy packet for a predetermined period of time with a failure as a triggering point, the dummy-packet transmitting unit stops transmitting the dummy packet even if the failure is not resolved.

6. The transmitting apparatus according to claim 1, wherein, after transmitting the dummy packet a predetermined number of times, the determining unit deletes the source address included in the dummy packet and the identification information corresponding to the source address stored in the storage unit from the storage unit.

7. A transmitting apparatus for connecting a first network to a second network, the first network having a function of storing information including a source address specified in a packet as learned information and using the learned information for controlling a path and a function of deleting information not used for a predetermined time from the learned information, the transmitting apparatus comprising:
a first communication control unit that controls a communication with the first network;
a second communication control unit that controls a communication with the second network; and
a protocol converting unit that intermediates between the first communication control unit and the second communication control unit, and performs a protocol conversion to enable a communication between the first network and the second network; wherein
the second communication control unit detects a failure path in the second network in which a failure has occurred, and notifies the protocol converting unit of identification information of the path,
upon being notified by the second communication control unit of the identification information of the failure path in which the failure has occurred, the protocol converting unit stores, after the protocol converting unit converts data transmitted from the second network to the first network into a packet including a source address of the data in a format transferable in the first network, the source address of the data included in the packet and identification information for identifying a path for the data in the second network in a corresponding manner in storage unit, determines whether the identification information of the failure path notified by the second communication control unit is stored in the storage unit or not, generates a dummy packet in which the source address of the data corresponding to the failure path is specified as a source address of a dummy packet, only when it is determined that the identification information of the failure path notified is stored in the storage unit, and transmits the generated dummy packet to the first network.

8. A transmitting apparatus for connecting a first network to a second network, the first network having a function of storing information including a source address specified in a packet as learned information and using the learned information for controlling a path and a function of deleting information not used for a predetermined time from the learned information, the transmitting apparatus comprising:

a first communication control unit that controls a communication with the first network;

a second communication control unit that controls a communication with the second network; and a protocol converting unit that intermediates between the first communication control unit and the second communication control unit, and performs a protocol conversion to enable a communication between the first network and the second network, wherein when converting data transmitted from the second network to the first network into a packet including a source address of the data in a format transferable in the first network, the protocol converting unit notifies the source address of the data included in the packet and identification information for identifying a path for the data in the second network, the second communication control unit detects a failure path in the second network in which a failure has occurred, and notifies the first communication control unit of identification information of the failure path, and the first communication control unit stores the source address of the data and the identification information of the failure path notified by the protocol converting unit in a corresponding manner in a storage unit, determines whether identification information of the failure path notified by the second communication control unit is stored in the storage unit or not, generates a dummy packet in which the source address of the data corresponding to the failure path is specified as a source address of the dummy packet, only when it is determined that the identification information of the failure path is stored in the storage unit, and transmits the generated dummy packet to the first network.

9. The transmitting apparatus according to claim 8, wherein the protocol converting unit notifies the first communication control unit of the identification information of the path and the source address, via a data line for transferring data from the second network to the first network.

10. The transmitting apparatus according to claim 8, wherein the second communication control unit notifies the first communication control unit of the identification information of the path, via a data line for transferring data from the second network to the first network.

11. A method of preventing a loss of learned information due to a failure in a second network in a network configured by connecting a first network to the second network, the first network having a function of storing information including a source address specified in a packet as the learned information and using the learned information for controlling a path and a function of deleting information not used for a predetermined time from the learned information, the method comprising:

converting data transmitted from the second network to the first network into a packet in a format transferable in the first network the packet including a source address of the data;

storing the source address of the data included in the packet and identification information for identifying a path for the data in the second network in a corresponding manner;

detecting a failure path in the second network in which a failure has occurred;

determining whether identification information of the failure path detected at the detecting is stored at the storing or not;

generating a dummy packet in which the source address of the data corresponding to the failure path is specified as a source address of the dummy packet, only when the determining determines that the identification information of the failure path is stored at the storing; and transmitting the dummy packet generated at the generating to the first network.

* * * * *

UNITED STATES PATENT AND TRADEMARK OFFICE
CERTIFICATE OF CORRECTION

| | | |
|---|---|---|
| PATENT NO. | : 8,064,331 B2 | Page 1 of 1 |
| APPLICATION NO. | : 11/442221 | |
| DATED | : November 22, 2011 | |
| INVENTOR(S) | : Masayuki Tanaka et al. | |

It is certified that error appears in the above-identified patent and that said Letters Patent is hereby corrected as shown below:

Column 18, Line 52, In Claim 7, after "manner in" insert -- a --.

Signed and Sealed this
Thirty-first Day of January, 2012

David J. Kappos
*Director of the United States Patent and Trademark Office*